US012747823B2

(12) United States Patent
Luo

(10) Patent No.: US 12,747,823 B2
(45) Date of Patent: Sep. 29, 2026

(54) BRACKET DEVICE

(71) Applicant: Dongguan Laiguang Electronic Technology Co., ltd., Dongguan (CN)

(72) Inventor: Zekai Luo, Dongguan (CN)

(73) Assignee: Dongguan Laiguang Electronic Technology Co., ltd., Dongguan (CN)

(*) Notice: Subject to any disclaimer, the term of this patent is extended or adjusted under 35 U.S.C. 154(b) by 0 days.

(21) Appl. No.: 19/321,342

(22) Filed: Sep. 8, 2025

(65) Prior Publication Data

US 2026/0002629 A1 Jan. 1, 2026

(30) Foreign Application Priority Data

Jul. 21, 2025 (CN) ........................ 202521527320.2

(51) Int. Cl.
*F16M 11/10* (2006.01)
*F16M 11/20* (2006.01)

(52) U.S. Cl.
CPC ......... *F16M 11/10* (2013.01); *F16M 11/2014* (2013.01)

(58) Field of Classification Search
CPC ......... F16M 11/10; F16M 11/06; F16M 11/24
USPC ............ 248/121, 125.1, 125.2, 125.3, 125.7, 248/125.8, 125.9, 371, 132, 133, 139, 248/142, 144, 161, 411, 157
See application file for complete search history.

(56) References Cited

U.S. PATENT DOCUMENTS

| | | | | | |
|---|---|---|---|---|---|
| 7,392,969 | B2 * | 7/2008 | Chiu | F16M 11/10 | 248/676 |
| 2007/0246619 | A1 * | 10/2007 | Chih | F16M 11/10 | 248/166 |
| 2008/0042020 | A1 * | 2/2008 | Laitila | F16M 11/2014 | 248/131 |
| 2009/0173868 | A1 * | 7/2009 | Fawcett | A47F 7/024 | 248/176.1 |
| 2013/0134287 | A1 * | 5/2013 | Gresset | A47F 7/024 | 248/551 |
| 2024/0360854 | A1 * | 10/2024 | Liu | F16M 13/022 | |

FOREIGN PATENT DOCUMENTS

| | | | | | |
|---|---|---|---|---|---|
| CN | 207145934 | A | | 3/2018 | |
| CN | 209575525 | A | | 11/2019 | |
| CN | 220090276 | A | | 11/2023 | |
| CN | 220204260 | A | | 12/2023 | |
| WO | WO-0074535 | A1 | * | 12/2000 | A47B 21/0314 |
| WO | WO-2010049662 | A1 | * | 5/2010 | A47F 7/024 |

* cited by examiner

*Primary Examiner* — Alfred J Wujciak

(57) ABSTRACT

The present application provides a bracket device, which includes a bracket main body, a clamping seat, and a support bracket. The clamping seat is movably connected to the bracket main body and moves along the axial direction of the bracket main body to adjust a clamping space between the clamping seat and the bracket main body. The clamping seat and the bracket main body are used for clamping an external component, and the external component is located in the clamping space; the support bracket is located on the side of the bracket main body opposite to the clamping seat; the support bracket is used for supporting a phototherapy component or a physiotherapy component; the support bracket is movably connected to the bracket main body and can rotate or swing relative to the bracket main body.

14 Claims, 4 Drawing Sheets

BRACKET DEVICE

CROSS-REFERENCE TO RELATED APPLICATIONS

This application claims priority to a Chinese Application No. 202521527320.2, filed on Jul. 21, 2024, titled “Bracket Device”, the entire contents of which are hereby incorporated herein by reference in their entirety.

TECHNICAL FIELD

The present application relates to the technical field of bracket devices, in particular to a bracket device.

BACKGROUND

With the development of science and technology, bracket devices are applied in people’s lives and used to support external electronic components, which can be phototherapy components or physiotherapy components. The bracket device supports the phototherapy components or physiotherapy components. In the related art, the existing bracket device includes a bracket main body and a clamping seat. The clamping seat is connected to the bracket main body. The bracket main body cooperates with the clamping seat to clamp external components, resulting in only having a clamping function. The bracket main body is used to support phototherapy components or physiotherapy components. However, the bracket main body cannot be moved or rotated, resulting in limited application scenarios of the existing bracket device.

SUMMARY

The purpose of the present application is to provide a bracket device and a phototherapy device. A clamping seat is movably connected to a bracket main body and moves along an axial direction of the bracket main body to adjust a clamping space between the clamping seat and the bracket main body. The clamping seat and the bracket main body are used for clamping an external component, and the external component is located in the clamping space. A support bracket is located on a side of the bracket main body away from the clamping seat, and the support bracket is used for supporting a phototherapy component or a physiotherapy component. The support bracket is movably connected to the bracket main body and can rotate or swing relative to the bracket main body, so that the support bracket has the effects of moving, rotating and swinging relative to the clamping seat, thereby realizing the application of the phototherapy component or the physiotherapy component in various scenarios, improving the compatibility of the bracket device with use scenarios, and achieving compatibility with multiple scenarios, such as bedside scenarios, tabletop scenarios, desktop scenarios or hanging scenarios.

To achieve the above purpose, the present application provides the following technical solutions: a bracket device including:

- a bracket main body;
- a clamping seat, movably connected to the bracket main body and moving along an axial direction of the bracket main body to adjust a clamping space between the clamping seat and the bracket main body, wherein the clamping seat and the bracket main body are configured for clamping an external component, and the external component is located in the clamping space; and

- a support bracket, located on a side of the bracket main body away from the clamping seat; wherein the support bracket is configured for supporting a phototherapy component or a physiotherapy component, and the support bracket is movably connected to the bracket main body and is rotatable or swingable relative to the bracket main body.

BRIEF DESCRIPTION OF THE DRAWINGS

To clarify the technical solutions in the embodiments of the present application more clearly, the following will briefly introduce the accompanying drawings needed in the description of the embodiments. Obviously, the accompanying drawings in the following description are only some embodiments of the present application. For those skilled in the art, other accompanying drawings can also be obtained based on these drawings without creative work. For a more complete understanding of the present application and its beneficial effects, the following will explain it in conjunction with the accompanying drawings. In the following description, the same reference numerals denote the same parts.

DETAILED DESCRIPTION OF THE EMBODIMENTS

Figure 1:
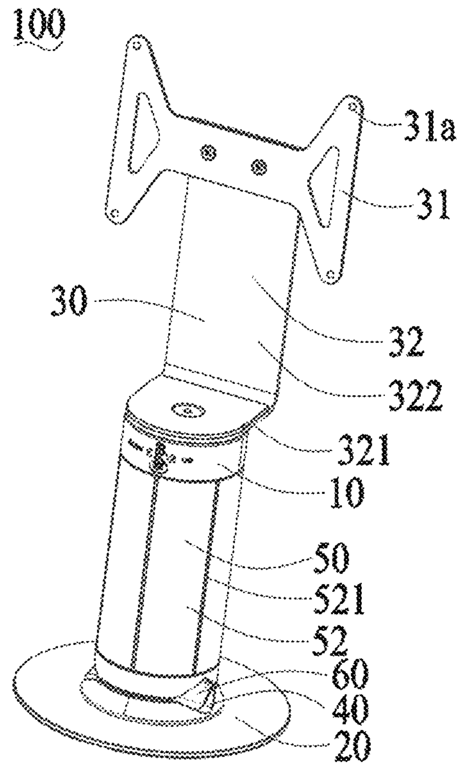
FIG. 1 is a view of a bracket assembly according to an embodiment of the present application.

The following will clearly and completely describe the technical solutions in the embodiments of the present application with reference to the accompanying drawings in the embodiments of the present application. Obviously, the described embodiments are only a part of the embodiments of the present application, rather than all the embodiments. Based on the embodiments in the present application, all other embodiments obtained by those skilled in the art without creative work shall fall within the protection scope of the present application.

Please refer to FIGS. 1 to 7. The present application provides a bracket device 100, which is used for clamping external components and supporting phototherapy components or physiotherapy components.

Please refer to FIGS. 1 to 7, in the embodiment of the present application, the bracket device 100 includes a bracket main body 10, a clamping seat 20, and a support bracket 30. The clamping seat 20 is movably connected to the bracket main body 10 and moves along the axial direction of the bracket main body 10 to adjust a clamping space **20*a* between the clamping seat 20 and the bracket main body 10. The clamping seat 20 and the bracket main body 10 are used for clamping an external component, and the external component is located in the clamping space 20***a*. The support bracket 30 is located on a side of the bracket main body 10 away from the clamping seat 20, and the support bracket 30 is used for supporting a phototherapy component or a physiotherapy component. The support bracket 30 is movably connected to the bracket main body 10 and can rotate or swing relative to the bracket main body 10, so that the support bracket 30 has the effects of moving, rotating, and swinging relative to the clamping seat 20, thereby realizing the application of the phototherapy component or the physiotherapy component in various scenarios, improving the compatibility of the bracket device 100 with use scenarios, and achieving compatibility with multiple scenarios, such as bedside scenarios, tabletop scenarios, desktop scenarios, or hanging scenarios. Please refer to FIGS. 1 to 7. In the embodiment of the present application, the bracket main body 10 serves as a support portion 31 of the bracket device 100, and the bracket main body 10 is used for supporting the clamping seat 20 and the support bracket 30.

The clamping seat 20 is provided on a lower side of the bracket main body 10. The clamping seat 20 is movably connected to the bracket main body 10 and moves along an axial direction of the bracket main body 10, so as to adjust the position of the clamping seat 20 relative to the bracket main body 10 and adjust the clamping space 20*a* between the clamping seat 20 and the bracket main body 10. The size of the clamping space 20*a* is adjusted with the movement of the clamping seat 20. The clamping seat 20 and the bracket main body 10 are used for clamping external components, and the external components are located in the clamping space 20*a*, so as to adapt to different clamping scenarios, with strong clamping compatibility, avoiding clamping only a single size.

The support bracket 30 is located on a side of the bracket main body 10 away from the clamping seat 20. The support bracket 30 is used for supporting a phototherapy component or a physiotherapy component. The support bracket 30 is movably connected to the bracket main body 10 and can rotate or swing relative to the bracket main body 10, so that the support bracket 30 has the effects of moving, rotating, and swinging relative to the clamping seat 20, thereby realizing the application of the phototherapy component or the physiotherapy component in various scenarios, improving the compatibility of the bracket device 100 with use scenarios, and achieving compatibility with multiple scenarios, such as bedside scenarios, tabletop scenarios, desktop scenarios, or hanging scenarios.

Please refer to FIGS. 1 to 4, in the embodiment of the present application, the bracket main body 10 is provided with a rotation hole 10*a*; the rotation hole 10*a* is located in a middle of the bracket main body 10. The support bracket 30 includes a support portion 31 and a rotation portion 32. The rotation portion 32 is rotatably connected to the bracket main body 10, so as to adjust a rotation position of the rotation portion 32 relative to the bracket main body 10, thereby facilitating the support bracket 30 to rotate relative to the bracket main body 10 through the rotation portion 32, and the rotation portion 32 rotates along an axial direction of the rotation hole 10*a*, so that the rotation portion 32 can rotate 360° relative to the support bracket 30. The support portion 31 is connected to the rotation portion 32 and rotates along with a rotation of the rotation portion 32, so that the phototherapy component or physiotherapy component supported by the support portion 31 can rotate 360° along the rotation hole 10*a*, so as to realize the rotation effect of the phototherapy component or physiotherapy component.

Please refer to FIGS. 1 to 4, in the embodiment of the present application, the rotation portion 32 is provided with a through hole 32*a*, and the through hole 32*a* is opposite to the rotation hole 10*a*. An axis of the through hole 32*a* is provided parallel to an axis of the rotation hole 10*a*, so that the through hole 32*a* is communicated with the rotation hole 10*a*. An inner side wall of the rotation hole 10*a* is provided with a threaded portion, which is used for threaded connection of an external screw. The screw is provided in a vertical direction, penetrates through the through hole 32*a*, and is screwed into the rotation hole 10*a*. An end of the screw is located on a side of the rotation portion 32 and limits the rotation portion 32 from being separated from the bracket main body 10, so that the end of the screw cooperates with the bracket main body 10 to limit the rotation portion 32 from moving in the up and down direction, thereby facilitating the rotation portion 32 to only rotate along the axial direction of the rotation hole 10*a*. A diameter of the through hole 32*a* is larger than that of the threaded portion of the screw, and the diameter of the through hole 32*a* is smaller than that of the end of the screw, so that the rotation portion 32 can rotate relative to the bracket main body 10 through the cooperation of the through hole 32*a* and the screw.

Please refer to FIGS. 1 to 4, in the embodiment of the present application, the rotation portion 32 is provided with a rotation arm 321 and a connection arm 322, and the rotation arm 321 and the connection arm 322 are of an integrated connection structure, which improves the connection strength of the rotation arm 321 and the connection arm 322, ensures the stable connection of the rotation arm 321 and the connection arm 322, and avoids the breakage of the rotation arm 321 and the connection arm 322. The rotation arm 321 and the connection arm 322 are L-shaped, the rotation arm 321 is provided in the horizontal direction, and the connection arm 322 is provided in the vertical direction. Optionally, the rotation arm 321 and the connection arm 322 are formed by integral molding, welding, die-casting, etc.

Please refer to FIGS. 1 to 4, in the embodiment of the present application, the rotation arm 321 is rotatably connected to the rotation hole 10*a*, so as to adjust the rotation position of the rotation arm 321 relative to the rotation hole 10*a*, thereby facilitating the rotation portion 32 to rotate relative to the bracket main body 10 through the rotation arm 321. The support portion 31 is swingably connected to the connection arm 322 and can adjust the angle relative to the connection arm 322, so that the support portion 31 can swing relative to the rotation portion 32 through the connection arm 322, thereby facilitating the swing adjustment of the support portion 31 relative to the bracket main body 10, and further facilitating the rotation and swing of the phototherapy component or physiotherapy component supported by the support portion 31 relative to the bracket main body 10.

Please refer to FIGS. 1 to 4, in the embodiment of the present application, the connection arm 322 is bent with a swing arm 3221. A side wall of the support portion 31 facing the connection arm 322 is provided with a swing seat 311, and the swing seat 311 is provided on the inner side of the swing arm 3221 and hinged to the swing arm 3221, so that the swing seat 311 can swing relative to the swing arm 3221 through the hinge, thereby facilitating the support portion 31 to swing relative to the connection arm 322 through the cooperation of the swing seat 311 and the swing arm 3221, ensuring the swing effect of the support portion 31, so as to realize the swing of the support portion 31 under external force. And the swing seat 311 swings relative to the swing arm 3221 and can maintain the corresponding shape in the non-swinging state.

The side wall of the support portion 31 away from the swing seat 311 is used for supporting the phototherapy component or physiotherapy component, so that the phototherapy component or physiotherapy component swings along with the swing of the support portion 31, thereby facilitating the adjustment of the phototherapy component or physiotherapy component at different angles, realizing the application of the phototherapy component or physiotherapy component in various scenarios, improving the compatibility of the bracket device 100 with use scenarios, and achieving compatibility with multiple scenarios, such as bedside scenarios, tabletop scenarios, desktop scenarios, or hanging scenarios.

Please refer to FIGS. 1 to 4, in the embodiment of the present application, a first silicone pad is attached to the side wall of the support portion 31 away from the swing seat 311, and the first silicone pad is used for attaching to the rear side wall of the phototherapy component or the rear side wall of the physiotherapy component, so that the phototherapy component or physiotherapy component can be fixed to the side wall of the support portion 31 away from the swing seat 311 through the first silicone pad, ensuring the connection stability of the phototherapy component or physiotherapy component relative to the support portion 31.

The support portion 31 is provided with mounting holes 31*a*, and the mounting holes 31*a* are provided along four corners of the support portion 31. The mounting holes 31*a* are used for bolts to pass through, so that the bolts can pass through the mounting holes 31*a* and be screwed into the phototherapy component or physiotherapy component, thereby facilitating the fixing of the phototherapy component or physiotherapy component to the support portion 31.

Figure 2:
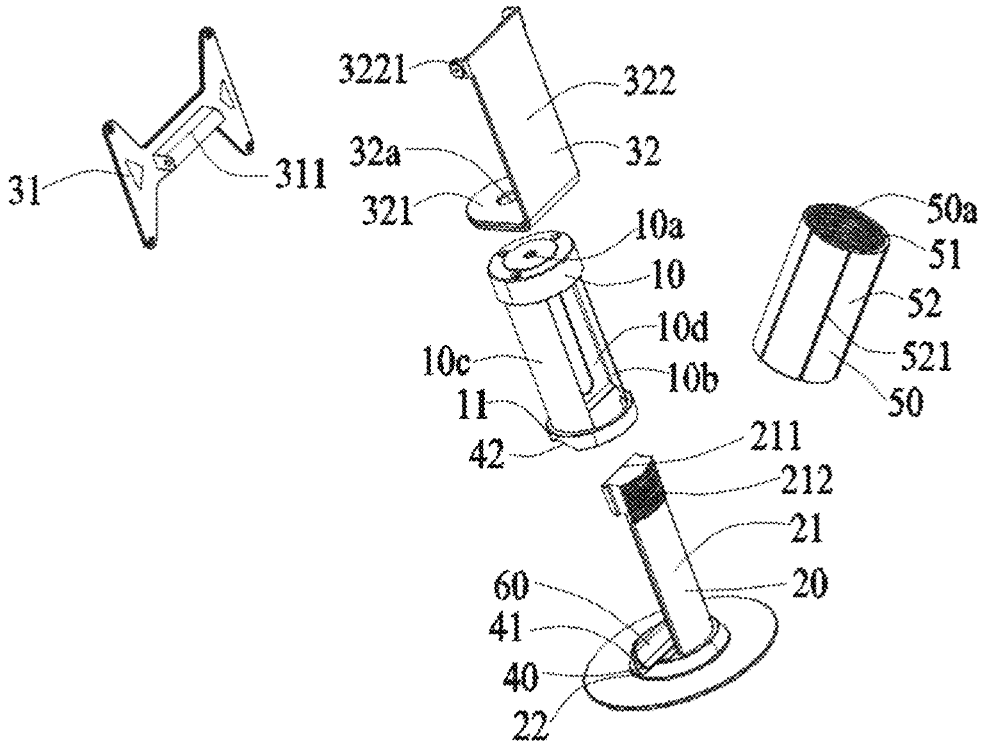
FIG. 2 is an exploded view of the bracket assembly according to an embodiment of the present application.
Figure 3:
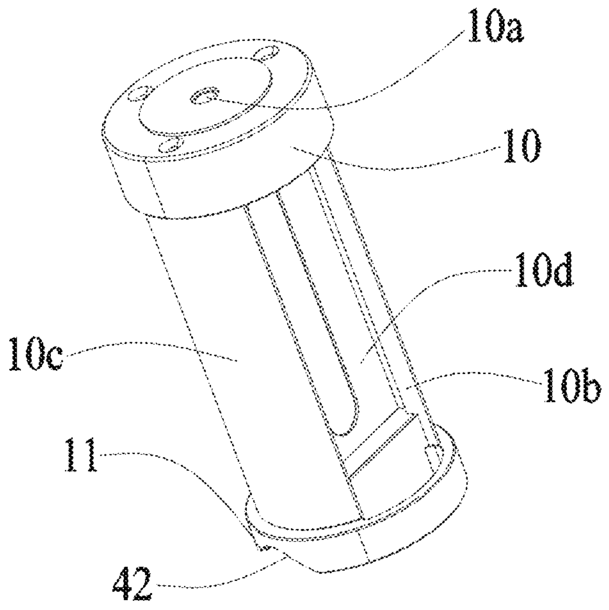
FIG. 3 is a view of a bracket main body of a bracket assembly according to an embodiment of the present application.
Figure 4:
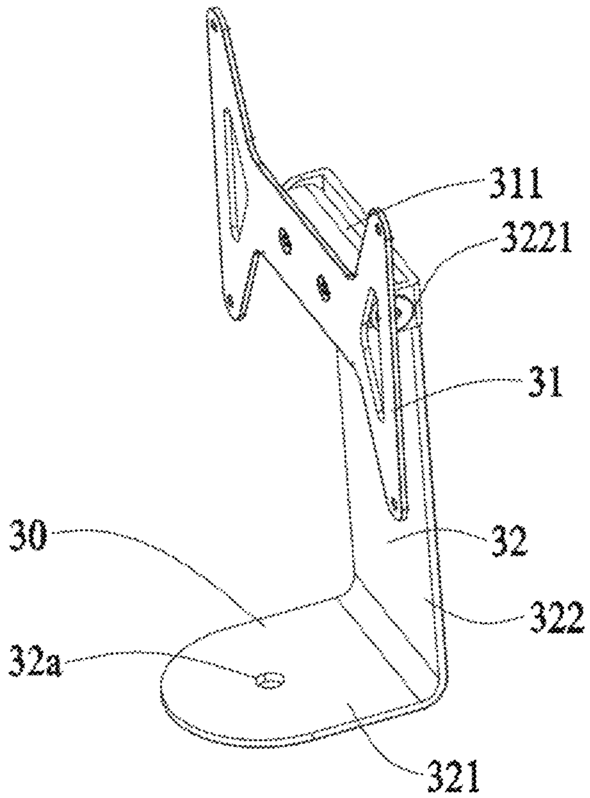
FIG. 4 is a view of a support bracket of the bracket assembly according to an embodiment of the present application.
Figure 5:
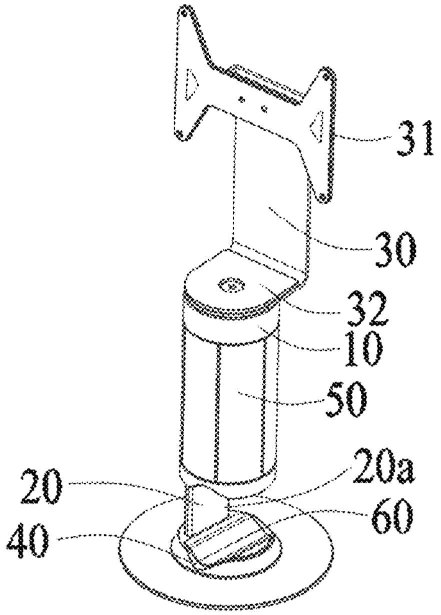
FIG. 5 is a view of a first use state of the bracket assembly according to an embodiment of the present application.
Figure 6:
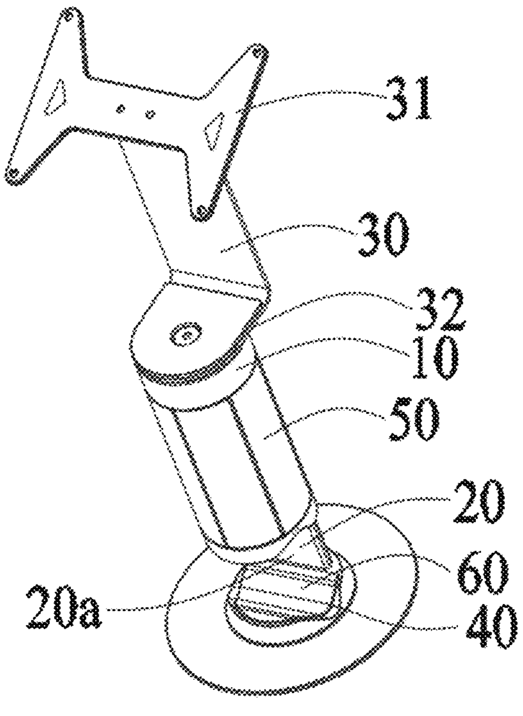
FIG. 6 is a view of a second use state of the bracket assembly according to an embodiment of the present application.
Figure 7:
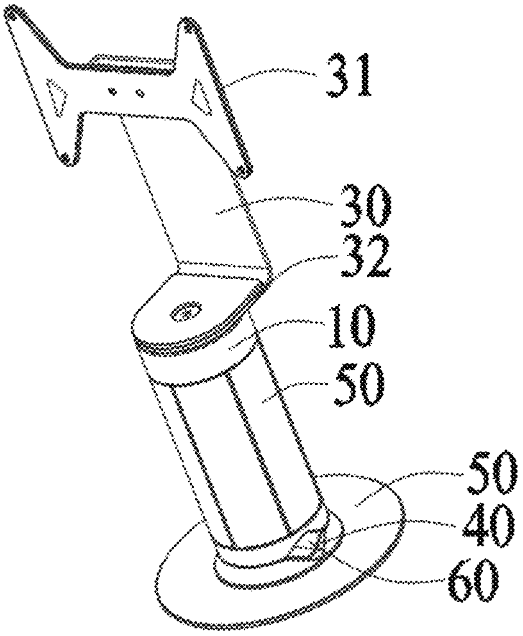
FIG. 7 is a view of a third use state of the bracket assembly according to an embodiment of the present application.

Please refer to FIGS. 1 to 3, in the embodiment of the present application, the bracket main body 10 is provided with a moving groove 10*b*, the moving groove 10*b* extends along the axial direction of the bracket main body 10. The clamping seat 20 is provided with a first arm 21, and the first arm 21 is provided with a moving portion 211. The moving portion 211 is movably connected to the moving groove 10*b* and moves along the axial direction of the bracket main body 10, so as to adjust the position of the moving portion 211 relative to the moving groove 10*b*, thereby facilitating the first arm 21 to move relative to the bracket main body 10 through the cooperation of the moving portion 211 and the moving groove 10*b*, so as to realize the movement of the clamping seat 20 relative to the bracket main body 10.

Please refer to FIGS. 1 to 3, in the embodiment of the present application, a clamping portion 40 is formed between the clamping seat 20 and the bracket main body 10, and the clamping portion 40 is provided with a clamping space 20*a* and used for clamping external components. The clamping space 20*a* is adjusted with the movement of the clamping seat 20 to adapt to different clamping scenarios, with strong clamping compatibility, avoiding clamping only a single size, thereby facilitating the clamping portion 40 to clamp external components of different sizes.

Please refer to FIGS. 1 to 3, in the embodiment of the present application, the bracket device 100 further includes a cylinder 50. The cylinder 50 is rotatably sleeved on the bracket main body 10 and rotates along its own axis, so as to adjust the position of the cylinder 50 relative to the bracket main body 10. The cylinder 50 is designed for users to rotate, facilitating its rotation under external force and improving the convenience of rotation. The cylinder 50 rotates at the same height relative to the bracket main body 10, ensuring that its height position relative to the bracket main body 10 remains unchanged during rotation.

Please refer to FIGS. 1 to 3, in the embodiment of the present application, the cylinder 50 is provided with a through hole 50*a*, which is used for the bracket main body 10 to pass through, so that the moving groove 10*b* of the bracket main body 10 is covered by the cylinder 50. An inner side wall of the through hole 50*a* is provided with a first connection portion 51; the first arm 21 is provided with a second connection portion 212, and the second connection portion 212 is connected to the first connection portion 51. The first arm 21 moves in the moving groove 10*b* along with the rotation of the cylinder 50, so that the cylinder 50 can drive the clamping seat 20 to move relative to the bracket main body 10 through the first arm 21. This allows the clamping space 20*a* of the clamping portion 40 to be adjusted with the movement of the clamping seat 20, adapting to different clamping scenarios, enhancing clamping compatibility, avoiding clamping only a single size, and thus facilitating the clamping portion 40 to clamp external components of different sizes.

Please refer to FIGS. 1 to 3, in the embodiment of the present application, the bracket main body 10 is provided with an annular groove 10*c*, and the cylinder 50 is located in the annular groove 10*c* and is limited by the inner side wall of the annular groove 10*c*. The upper and lower side walls of the annular groove 10*c* limit the cylinder 50 from moving up and down, ensuring that the height position of the cylinder 50 relative to the bracket main body 10 remains unchanged.

Please refer to FIGS. 1 to 3, in the embodiment of the present application, the cylinder 50 is provided with a gripping portion 52 for users to grip, the gripping portion 52 can be as the outer side wall of the cylinder 50 or protrude outward from the outer side wall of the cylinder 50, facilitating users to grip the gripping portion 52 to rotate the cylinder 50 and improving the convenience of rotation for users.

Please refer to FIGS. 1 to 3, in the embodiment of the present application, when the gripping portion 52 serves as the outer side wall of the cylinder 50, the gripping portion 52 is provided with a first friction portion 521 for contact with the user's hand. The first friction portion 521 is a groove or friction stripe on the gripping portion 52. The first friction portion 521 is provided along the axial or circumferential direction of the cylinder 50, so as to increase the friction between the user and the cylinder 50 through the first friction portion 521 and prevent slipping during rotation.

Please refer to FIGS. 1 to 3, in the embodiment of the present application, the first connection portion 51 is a first threaded portion, which is provided along the axial direction of the cylinder 50. The second connection portion 212 is a second threaded portion, and the second threaded portion is engaged with the first threaded portion. The second connection portion 212 is provided on the outer side wall of the first arm 21 and close to the end of the first arm 21, so that the cylinder 50 can be threaded to the first arm 21 through the cooperation of the first threaded portion and the second threaded portion, such that the second threaded portion can move relative to the first threaded portion when the cylinder 50 drives the first threaded portion to rotate, thereby facilitating the movement of the first arm 21 relative to the moving groove 10*b* to realize the movement of the clamping seat 20 relative to the bracket main body 10. Optionally, the first threaded portion is an internal thread, and the second threaded portion is an external thread.

Please refer to FIGS. 1 to 3, in the embodiment of the present application, the moving groove 10*b* is provided along the axial direction of the bracket main body 10 and is provided on the outer side wall of the bracket main body 10, to expose a groove opening of the moving groove 10*b* to the external environment. The first arm 21 is further provided with a moving portion 211, which is provided on the inner side wall of the first arm 21 facing the moving groove 10*b*. An outer contour of the moving portion 211 is in clearance fit with an inner contour of the moving groove 10*b*, and the moving portion 211 is movably connected to the moving groove 10*b*, facilitating adjustment of the position of the moving portion 211 relative to the moving groove 10*b*, thus enabling the first arm 21 to move relative to the moving groove 10*b* through the moving portion 211. The moving portion 211 and the second connection portion 212 are respectively provided on the inner and outer side walls of the first arm 21, so that the second connection portion 212 is exposed outside the bracket main body 10, facilitating its connection with the first connection portion 51.

Please refer to FIGS. 1 to 3, in the embodiment of the present application, the moving portion 211 and the second connection portion 212 are stacked along a thickness direction of the first arm 21. An inner side wall of the moving groove 10*b* is provided with an accommodation groove 10*d*, which is provided in a long strip shape along the moving direction of the moving groove 10*b*. The accommodation groove 10*d* is used to hold oil, which increases the smoothness of the movement of the moving portion 211 relative to the moving groove 10*b* and avoids jamming during movement. Meanwhile, the inner side wall of the accommodation groove 10*d* limits the moving range of the moving portion 211 to prevent the first arm 21 from detaching from the bracket main body 10.

Please refer to FIGS. 1 to 3, in the embodiment of the present application, a first side wall 22 and a second side wall 11 of the clamping seat 20 and the bracket main body 10 are opposite to each other, and the clamping portion 40 is provided on the first side wall 22 and/or the second side wall 11. When the clamping portion 40 is provided on the first side wall 22 or the second side wall 11, it can clamp the external component to the first side wall 22 or the second side wall 11 through one-sided pressure, which is suitable for external components with dimensional tolerances. When the clamping portion 40 is provided on both the first side wall 22 and the second side wall 11, it ensures the central positioning of the external component, avoids tilting or deformation of the external component due to one-sided force, and is suitable for high-precision scenarios.

Please refer to FIGS. 1 to 3, in the embodiment of the present application, the clamping portion 40 includes a first sub-clamping portion 41 and a second sub-clamping portion 42. The first sub-clamping portion 41 is provided on the first side wall 22 and provided in a V-shape, and the second sub-clamping portion 42 is provided on the second side wall 11 and provided in a V-shape. The openings of the two V-shapes are provided away from each other, forming a "four-line and four-point" geometric constraint. Once the external component is inserted, the four inclined surfaces guide it simultaneously, pushing the axis of the external component to the geometric center of the clamping portion 40, realizing self-centering without adjustment and ensuring the clamping stability of the first sub-clamping portion 41 and the second sub-clamping portion 42 on the external component.

Please refer to FIGS. 1 to 3, in the embodiment of the present application, the bracket device 100 further includes a flexible pad 60, which is provided on the first side wall 22 or the second side wall 11 and can flexibly contact the outer side wall of the clamped external component. The flexible pad 60 ensures that the clamping portion 40 clamps the external component without damaging it, and also provides an anti-vibration effect.

Compared with the related art, the beneficial effects of the present application are as follows: the present application provides a bracket device 100 and a phototherapy device. The clamping seat 20 is movably connected to the bracket main body 10 and moves along the axial direction of the bracket main body 10 to adjust the clamping space 20*a* between the clamping seat 20 and the bracket main body 10. The clamping seat 20 and the bracket main body 10 are used for clamping an external component, and the external component is located in the clamping space 20*a*. The support bracket 30 is located on the side of the bracket main body 10 away from the clamping seat 20. The support bracket 30 is used for supporting a phototherapy component or a physiotherapy component. The support bracket 30 is movably connected to the bracket main body 10 and can rotate or swing relative to the bracket main body 10, so that the support bracket 30 has the effects of moving, rotating, and swinging relative to the clamping seat 20, thereby realizing the application of the phototherapy component or the physiotherapy component in various scenarios, improving the compatibility of the bracket device 100 with use scenarios, and achieving compatibility with multiple scenarios, such as bedside scenarios, tabletop scenarios, desktop scenarios, or hanging scenarios.

In the above embodiments, the description of each embodiment focuses on different aspects. For parts not described in detail in a certain embodiment, reference can be made to the relevant descriptions of other embodiments.

In the description of the present application, the terms "first" and "second" are only used for descriptive purposes and cannot be understood as indicating or implying relative importance or implicitly indicating the number of indicated technical features. Therefore, the features defined with "first" and "second" may explicitly or implicitly include one or more of such features.

Herein, specific examples are used to illustrate the principles and implementation methods of the present application. The descriptions of the above embodiments are only used to help understand the methods and core ideas of the present application; at the same time, for those skilled in the art, there will be changes in the specific implementation methods and application scopes according to the ideas of the present application. In conclusion, the content of this specification should not be understood as a limitation to the present application.

What is claimed is:

1. A bracket device, comprising:

a bracket main body;

a clamping seat, movably connected to the bracket main body and moving along an axial direction of the bracket main body to adjust a clamping space between the clamping seat and the bracket main body, wherein the clamping seat and the bracket main body are configured for clamping an external component, and the external component is located in the clamping space; and a support bracket, located on a side of the bracket main body away from the clamping seat;

wherein the support bracket is configured for supporting a phototherapy component or a physiotherapy component, and the support bracket is movably connected to the bracket main body and is rotatable or swingable relative to the bracket main body;

wherein the bracket main body is provided with a rotation hole;

the support bracket comprises a support portion and a rotation portion, the rotation portion is rotatably connected to the bracket main body and rotates along an axial direction of the rotation hole;

the support portion is connected to the rotation portion and rotates along with a rotation of the rotation portion;

the rotation portion is provided with a rotation arm and a connection arm, and the rotation arm and the connection arm are of an integrated connection structure; and the rotation arm is rotatably connected to the rotation hole, and the support portion is swingably connected to the connection arm and adjust angle relative to the connection arm.

2. The bracket device according to claim 1, wherein the rotation portion is provided with a through hole, and the through hole is opposite to the rotation hole, and an axis of the through hole is provided parallel to an axis of the rotation hole;

an inner side wall of the rotation hole is provided with a threaded portion, the threaded portion is configured for threaded connection of an external screw, and the screw penetrates through the through hole and is screwed into the rotation hole; and an end of the screw is located on a side of the rotation portion and limits the rotation portion from being separated from the bracket main body.

3. The bracket device according to claim 1, wherein the connection arm is bent with a swing arm;

a side wall of the support portion facing the connection arm is provided with a swing seat, and the swing seat is provided on the swing arm and hinged to the swing arm; and a side wall of the support portion away from the swing seat is configured for supporting the phototherapy component or the physiotherapy component.

4. The bracket device according to claim 1, wherein a first silicone pad is attached to the side wall of the support portion away from a swing seat, and the first silicone pad is configured for attaching to a rear side wall of the phototherapy component or a rear side wall of the physiotherapy component.

5. The bracket device according to claim 1, wherein the bracket main body is provided with a moving groove, and the moving groove extends along the axial direction of the bracket main body;

the clamping seat is provided with a first arm, the first arm is provided with a moving portion, and the moving portion is movably connected to the moving groove and moves along the axial direction of the bracket main body; and a clamping portion is formed between the clamping seat and the bracket main body, and the clamping portion is provided with the clamping space and configured for clamping the external component.

6. The bracket device according to claim 5, wherein the bracket device further comprises a cylinder rotatably sleeved on the bracket main body and rotates along an axis of the cylinder;

the cylinder is configured for a user to rotate, and rotates at a same height relative to the bracket main body;

the cylinder is provided with a through hole for the bracket main body to pass through; an inner side wall of the through hole is provided with a first connection portion; and the first arm is provided with a second connection portion, the second connection portion is connected to the first connection portion, and the first arm moves in the moving groove along with a rotation of the cylinder.

7. The bracket device according to claim 6, wherein the first connection portion is a first threaded portion, and the first threaded portion is provided along an axial direction of the cylinder;

the second connection portion is a second threaded portion, and the second threaded portion is engaged with the first threaded portion; and the second connection portion is provided on an outer side wall of the first arm and close to an end of the first arm.

8. The bracket device according to claim 5, wherein a first side wall and a second side wall of the clamping seat and the bracket main body are opposite to each other, and the clamping portion is provided on the first side wall and/or the second side wall;

the clamping portion comprises a first sub-clamping portion and a second sub-clamping portion, the first sub-clamping portion is provided on the first side wall and is in a V-shaped arrangement, and the second sub-clamping portion is provided on the second side wall and is in a V-shaped arrangement; and the bracket device further comprises a flexible pad provided on the first side wall or the second side wall and flexibly contacting an outer side wall of a clamped external component.

9. A bracket device, comprising:

a bracket main body;

a clamping seat, movably connected to the bracket main body and moving along an axial direction of the bracket main body to adjust a clamping space between the clamping seat and the bracket main body, wherein the clamping seat and the bracket main body are configured for clamping an external component, and the external component is located in the clamping space; and a support bracket, located on a side of the bracket main body away from the clamping seat; wherein the support bracket is configured for supporting a phototherapy component or a physiotherapy component;

wherein the bracket main body is provided with a moving groove, and the moving groove extends along the axial direction of the bracket main body;

the clamping seat is provided with a first arm, the first arm is provided with a moving portion, and the moving portion is movably connected to the moving groove and moves along the axial direction of the bracket main body;

a clamping portion is formed between the clamping seat and the bracket main body, and the clamping portion is provided with the clamping space and configured for clamping the external component;

wherein the bracket device further comprises a cylinder rotatably sleeved on the bracket main body and rotates along an axis of the cylinder;

the cylinder is configured for a user to rotate, and the cylinder rotates at a same height relative to the bracket main body;

the cylinder is provided with a through hole for the bracket main body to pass through, and an inner side wall of the through hole is provided with a first connection portion; and the first arm is provided with a second connection portion, the second connection portion is connected to the first connection portion, and the first arm moves in the moving groove along with a rotation of the cylinder.

10. The bracket device according to claim 9, wherein a first side wall and a second side wall of the clamping seat and the bracket main body are opposite to each other, and the clamping portion is provided on the first side wall and/or the second side wall;

the clamping portion comprises a first sub-clamping portion and a second sub-clamping portion, the first sub-clamping portion is provided on the first side wall and is in a V-shaped arrangement, and the second sub-clamping portion is provided on the second side wall and is in a V-shaped arrangement; and the bracket device further comprises a flexible pad provided on the first side wall or the second side wall and flexibly contacting an outer side wall of a clamped external component.

11. The bracket device according to claim 9, wherein the bracket main body is provided with an annular groove, the cylinder is located in the annular groove and is limited by an inner side wall of the annular groove, so that upper and lower side walls of the annular groove limit the cylinder from moving in an up and down direction, to ensure that a height position of the cylinder relative to the bracket main body remains unchanged.

12. The bracket device according to claim 9, wherein the cylinder is provided with a gripping portion for the user to grip, and the gripping portion is used as an outer side wall of the cylinder, or the gripping portion protrudes outward from the outer side wall of the cylinder;

when the gripping portion is used as the outer side wall of the cylinder, the gripping portion is provided with a first friction portion for the user's hand to contact; and the first friction portion is a groove or a friction stripe of the gripping portion, and the first friction portion is provided along the axial direction or a circumferential direction of the cylinder, to increase a friction force between the user and the cylinder through the first friction portion.

13. The bracket device according to claim 9, wherein the support bracket is movably connected to the bracket main body and is rotatable or swingable relative to the bracket main body;

the bracket main body is provided with a rotation hole;

the support bracket comprises a support portion and a rotation portion, and the rotation portion is rotatably connected to the bracket main body and rotates along an axial direction of the rotation hole; and the support portion is connected to the rotation portion and rotates along with a rotation of the rotation portion.

14. The bracket device according to claim 13, wherein the rotation portion is provided with a through hole, and the through hole is opposite to the rotation hole, and an axis of the through hole is provided parallel to an axis of the rotation hole;

an inner side wall of the rotation hole is provided with a threaded portion for threaded connection of an external screw, and the screw penetrates through the through hole and is screwed into the rotation hole; and an end of the screw is located on a side of the rotation portion and limits the rotation portion from being separated from the bracket main body.

* * * * *